United States Patent
Vogl et al.

(10) Patent No.: US 7,733,843 B1
(45) Date of Patent: Jun. 8, 2010

(54) MEDIA ACCESS FOR COMMUNICATION SYSTEM

(75) Inventors: Thomas L. Vogl, Cedar Rapids, IA (US); Erik M. Sjolander, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 493 days.

(21) Appl. No.: 11/894,537

(22) Filed: Aug. 21, 2007

(51) Int. Cl.
*H04J 3/06* (2006.01)
(52) U.S. Cl. ...................................... 370/350
(58) Field of Classification Search ........................ None
See application file for complete search history.

(56) References Cited

U.S. PATENT DOCUMENTS 7,158,542 B1 * 1/2007 Zeng et al. .................. 370/513

2005/0053048 A1 * 3/2005 Van Der Wal et al. ....... 370/350
2008/0253320 A1 * 10/2008 Piggin et al. ................. 370/329

* cited by examiner

*Primary Examiner*—Anh-Vu Ly
(74) *Attorney, Agent, or Firm*—Matthew J. Evans; Daniel M. Barbieri

(57) ABSTRACT

A method for receiving data packets in a communication network comprising scanning a channel for a preamble during an acquisition search window, detecting the preamble during the acquisition search window, assigning a reception acquisition search window for receipt of a data packet including a data preamble and a data portion, coordinating the transmission of the data packet with the reception acquisition search window, detecting the data preamble during the reception acquisition search window, and initiating receipt of the data portion upon detection of the data preamble.

11 Claims, 7 Drawing Sheets

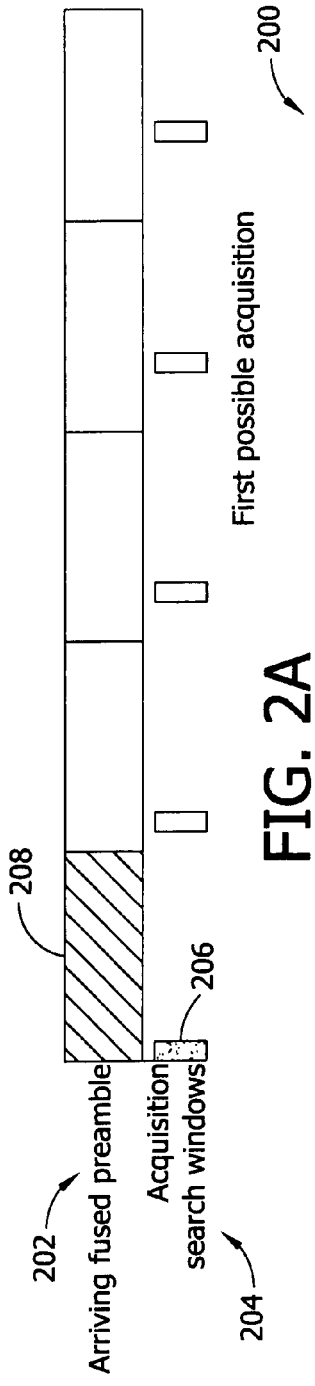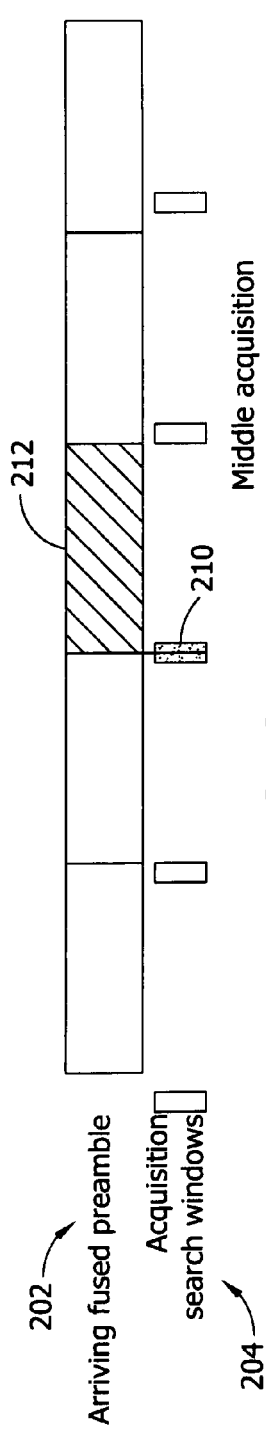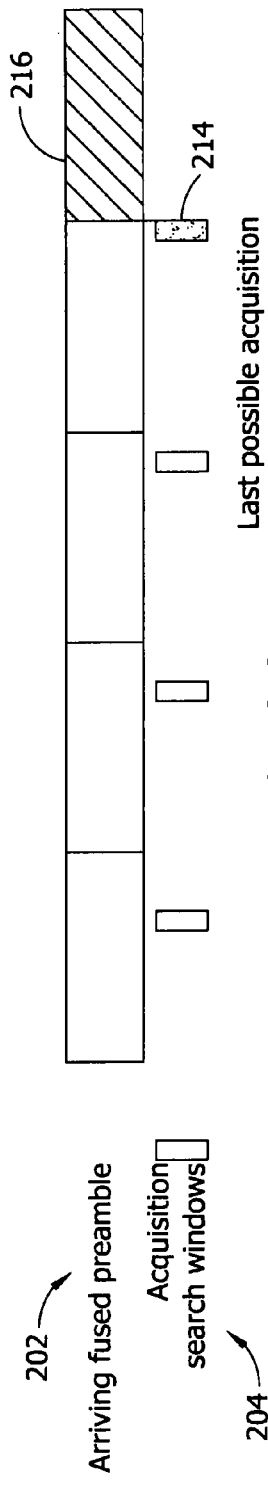

MEDIA ACCESS FOR COMMUNICATION SYSTEM

FIELD OF THE INVENTION

The present invention generally relates to the field of communications, and more particularly to an acquisition process for a low signal-to-noise ratio (SNR) communication system.

BACKGROUND OF THE INVENTION

In many situations, such as military or security applications, it is desirable to have communication systems with modes supporting low probability of detection (LPD). LPD communication systems may provide users with a tactical advantage or enhanced safety relative to other communication systems, such as through increasing difficulty of a non-member of the system to acquire and recognize signal transmissions. A significant challenge for LPD-supporting communication systems is to operate at extremely low signal-to-noise ratios (SNR), including SNR of well below negative 20 decibels (dB). For instance, LPD communication systems must be capable of distinguishing low power signal transmissions from background "noise" in the system.

There are typically two fundamental parts of receiving a signal transmission: (1) detecting the signal transmission presence and (2) receiving the data portion of the signal transmission. In general, detecting the signal transmission presence is accomplished by including some known sequence of bits at a known position of a transmission (for example, typically in the first few bits). These known sequences of bits sometimes may be referred to as preambles, since they generally precede a data or message portion of a signal transmission. A communication system receiver correlates received signal information against the known sequence and uses information gathered to establish timing and Doppler estimates for the signal message. The estimated timing information is then used to demodulate the data portion of the message.

The two fundamental parts of receiving a signal transmission may differ in that signal transmission presence detection occurs via acquisition hardware of a communication system. The acquisition hardware searches for a message with any Doppler/timing offset. Whereas receiving the data portion involves data demodulation that demodulates the signal at a given time (typically after the signal transmission presence detection is completed).

In most communication systems, detecting signal transmission presence is easily accomplished. For example, a power measurement on the communication channel may be sufficient to detect a signal transmission. Communication systems that handle slightly lower SNRs are able to run acquisition correlators that continuously search over all time offset/Doppler combinations to locate acquisition preambles. However, the hardware required for this type of acquisition grows roughly linearly with the length of the acquisition preamble, making it infeasible for the very long acquisition preambles needed at very low SNRs. Thus, it is desirable for a communication system to operate at very low SNRs while reducing the hardware required for successful operation.

SUMMARY OF THE INVENTION

Accordingly, the various embodiments of the present invention are directed to a communication system supporting LPD modes, as well as a method for designing and implementing the same. In a first aspect of the present invention, a method for receiving data packets in a communication network comprises periodically scanning a channel for a preamble during an acquisition search window. Method also comprises detecting the preamble during the acquisition search window. Method further comprises assigning a reception acquisition search window for receipt of a data packet including a data preamble and a data portion. Method still further comprises coordinating the transmission of the data packet with the reception acquisition search window. Additionally, method comprises detecting the data preamble during the reception acquisition search window. Method also comprises initiating receipt of the data portion upon detection of the data preamble. Method is suitable for operating at very low SNRs while reducing the hardware required for successful operation.

In another aspect of the present invention, a communication system comprises a transmitter for transmitting a signal with a preamble. System also comprises a receiver communicably connected to the transmitter for receiving the signal. System further comprises an acquisition correlator for searching for the preamble via an acquisition search window. The transmitter coordinates transmitting the signal with the acquisition search window, the acquisition search window detects the preamble, and the acquisition correlator initiates receipt of the signal upon detection of the preamble. System is suitable for operating at very low SNRs while reducing the hardware required for successful operation.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 2A-2C are block diagrams of another acquisition process of an LPD communication system including fused preambles;

DETAILED DESCRIPTION OF THE INVENTION

Reference will now be made in detail to the presently preferred embodiments of the invention, examples of which are illustrated in the accompanying drawings.

Figure 1:
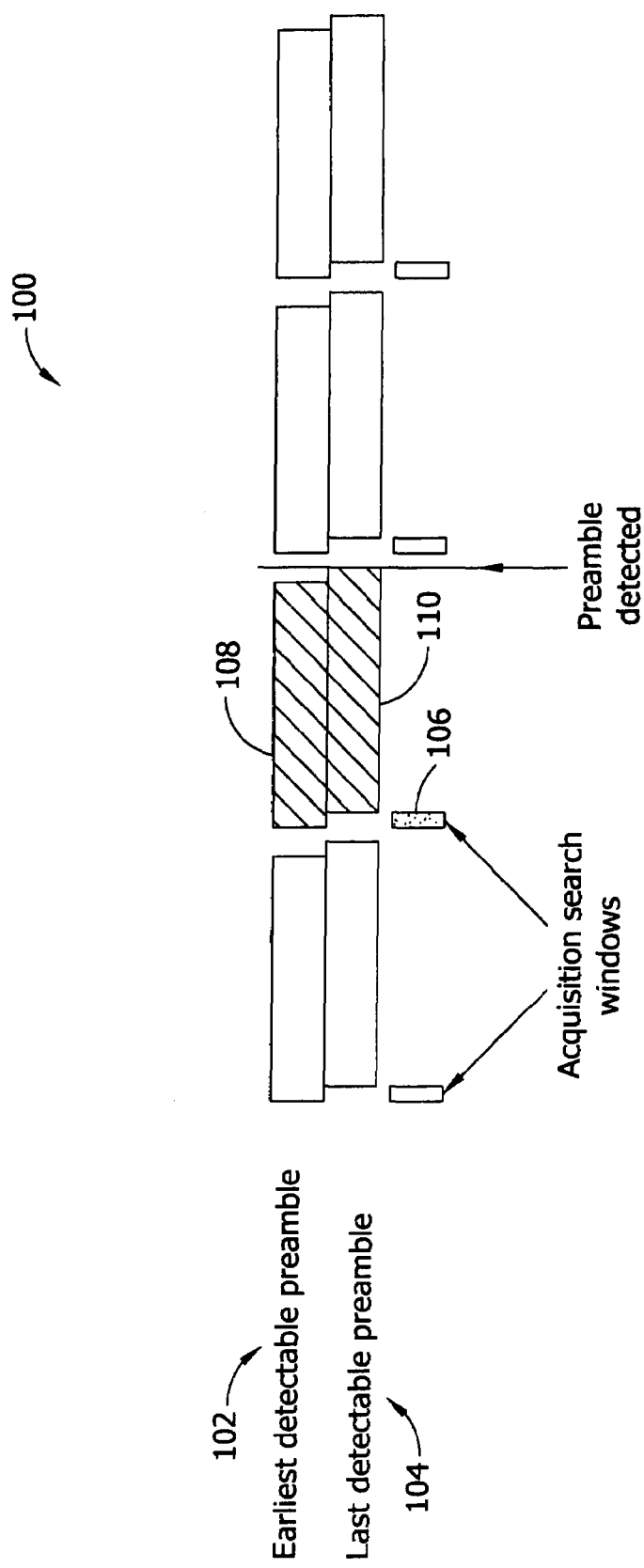
FIG. 1 is a block diagram of an acquisition process of an LPD communication system in accordance with an exemplary embodiment of the present invention.

FIG. 1 depicts a block diagram of an acquisition process 100 of an LPD communication system in accordance with an exemplary embodiment of the present invention. In a present embodiment, the LPD communication system is ad-hoc, involving peer-to-peer media access control in a mobile radio network. For example, no nodes on the network have any special position or authority. However, it may be appreciated that the present invention may be directed to any communication system supporting LPD modes, including client/server protocols, ad hoc peer-to-peer, and the like. Acquisition process 100 is directed to the first step of receiving a signal transmission: detecting the presence of the signal transmission. The signal transmission (whether from a source device or a destination device) includes a plurality of preambles, such as an earliest detectable preamble 102 and a last detectable preamble 104, for including some known sequence of bits in the transmission. An acquisition correlator on the corresponding device (for example, on the destination device if the signal transmission originated from the source device) is utilized to search for at least one of the plurality of preambles. The plurality of preambles, which are detected by the acquisition correlator may consist of a known sequence of bits on a known frequency or time hopping pattern. Correlating these known parameters enables the acquisition correlator to recognize an incoming signal as a useful signal transmission, differentiating the signal transmission from background noise.

Acquisition process 100 comprises a plurality of relatively short acquisition search windows, such as acquisition search window 106, to detect any acquisition preamble of a signal transmission beginning during the duration of the search window. For instance, acquisition search window 106 represents the time that hardware of the acquisition correlator searches for any acquisition preamble of a signal transmission. In order to reduce hardware requirements of an LPD communication system, an acquisition search window is relatively short compared to the relatively long preamble required at very low SNRs. For example, acquisition search window 106 is 1/20 the length of the acquisition preambles that occur during or may be detected during acquisition search window 106, such as preamble 108 and preamble 110.

An acquisition search window may be periodically repeated to detect an incoming acquisition preamble. In a present embodiment, the time between two acquisition search windows is constant and is the sum of the length of an acquisition search window, an acquisition preamble, and, if desirable, processing time. The acquisition correlator detects both preamble 108 and preamble 110 as starting during acquisition search window 106. The acquisition correlator then initiates receipt of the signal, such as by triggering data demodulation hardware to begin demodulating data from a data portion of the message sent via the signal transmission. In one embodiment, the data demodulation hardware is triggered at the "Preamble detected" line of FIG. 1. The data portion is not shown in FIG. 1, but would follow each acquisition preamble (e.g., preamble 108 and preamble 110) and overlap with subsequent preambles.

While the acquisition correlator searches for any acquisition preamble beginning during a particular acquisition search window, the acquisition correlator may acquire multiple signals during the same acquisition search window. For instance, the LPD communication system may comprise multiple copies of demodulation hardware to simultaneously receive multiple messages (or data portions of messages) from multiple transmitters (potentially on multiple devices within the communication system). Received signals from an LPD communication system may be well below the noise level in the system, and therefore little additional interference may be present when receiving multiple transmissions simultaneously. In one embodiment of the present invention, multiple radio frequency (RF) demodulators capable of simultaneously receiving on several channels (or all channels) are used to simultaneously receive frequency-hopped communication system transmissions (i.e., simultaneous multi-receive).

Referring now to FIGS. 2A-2C, block diagrams of an acquisition process 200 of a communication system comprising fused preambles are illustrated in accordance with an exemplary embodiment of the present invention. Fused preambles, such as arriving fused preamble 202, comprise a plurality of acquisition preambles (generally, but not necessarily, consecutive) in a single message, which are treated logically as a single, longer preamble. Each preamble within a fused preamble provides an independent and separate time frame for an acquisition search window to acquire the preamble. Fused preambles may enhance the tolerance of a communication system for time skew effects, such as effects caused by propagation delay and clock drift, which can be especially severe when the communication system operates at low SNRs and utilizes relatively short acquisition search windows. Acquisition process 200 comprises a plurality of relatively short acquisition search windows 204 (including individual acquisition search window 206, 210, and 214). For example, acquisition search windows 204 may be 1/20 the length of one preamble segment of the arriving fused preamble (such as individual preamble 208, 212, and 216).

FIGS. 2A-2C display exemplary preamble acquisition modes from arriving fused preamble 202 and indicate how a fused preamble may assist in tolerating time skew effects. The orientation of arriving fused preamble 202 relative to acquisition search windows 204 may change as a result of time skew effects. In a present embodiment, the spacing between acquisition search windows 204 is the sum of the length of an individual acquisition preamble (such as individual preamble 208, 212, and/or 216) and the length of an acquisition search window (such as individual acquisition search window 206, 210, and/or 214). Since the width between acquisition search windows is greater than a preamble segment of the fused preamble, each acquisition search window may detect an acquisition preamble with a different offset. For example, the first bit of preamble 208 may be detected at the beginning of acquisition search window 206 (FIG. 2A). Additionally, the first bit of preamble 212 may be detected during the middle of acquisition search window 210 (FIG. 2B). Further, the first bit of preamble 216 may be detected at the end of acquisition search window 214 (FIG. 2C). Therefore, a fused preamble configuration provides an advantage of increased tolerance for total time offset. For example, the total time offset that can be tolerated increases approximately linearly with the number of preambles fused. A further advantage is that no additional hardware cost is required for the increased tolerance.

The acquisition correlator used in acquisition process 200 finishes correlating the signal transmission (i.e., detecting the presence of the signal transmission) at the end of the detected acquisition preamble time. For instance, in FIG. 2A, the correlation is complete at the end of preamble 208, whereas in FIG. 2B, the correlation is complete at the end of preamble 212, and in FIG. 2C, the correlation is complete at the end of preamble 216. While the correlation may be complete before the complete duration of arriving fused preamble 202, the data modulation may occur after the end of the last preamble segment of arriving fused preamble 202 (e.g., after preamble 216).

In a present embodiment, a signal transmission is coordinated with known acquisition search windows in order to properly detect a low SNR signal transmission during the relatively short acquisition search window. Coordination may involve transmitting messages with preambles such that an intended destination node receives the transmission during an anticipated timeslot. Thus, by coordinating the transmission and/or reception of signals, the present invention may reduce hardware requirements by maintaining relatively short, yet accurate, acquisition search windows.

Figure 3:
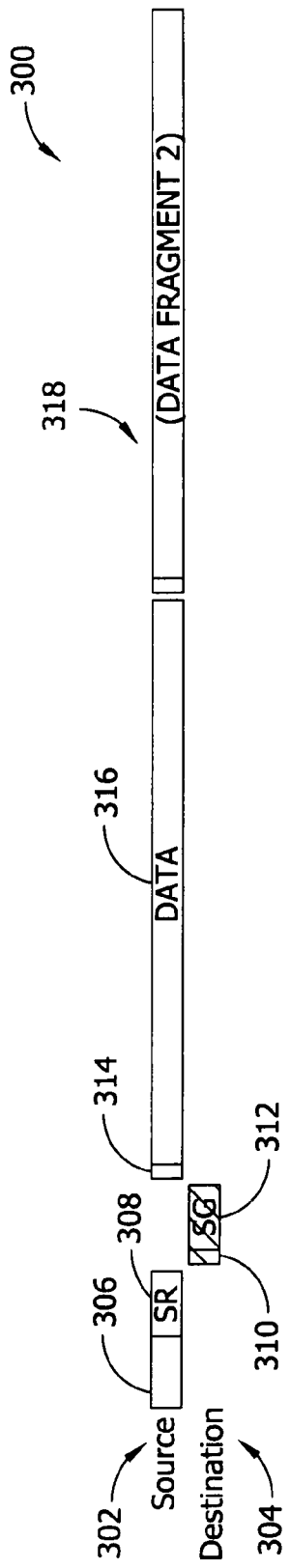
FIG. 3 is a Slot Request/Slot Grant (SR/SG) protocol displayed in accordance with an exemplary embodiment of the present invention.

Referring now to FIG. 3, a Slot Request/Slot Grant (SR/SG) protocol 300 is displayed in accordance with an exemplary embodiment of the present invention. SR/SG protocol 300 comprises low SNR communication system properties including acquisition search windows, fused preambles, and simultaneous multi-receive. Additionally, SR/SG protocol 300 may be fully ad hoc and decentralized (e.g., no nodes having any special position or authority). Accurate network-wide synchronization is required for ad hoc and decentralized capability, however the synchronization may be maintained by some external means. SR/SG protocol 300 involves bidirectional communication between a source 302 and a destination 304 for scheduling transfer of data. Source 302 may be a node configured to send an SR 308 to destination 304. Destination 304 is configured to assign an acquisition search window to the signal used by the source. Destination 304 relays the acquisition search window information to source 302 via an SG 312. Source 304 then uses the acquisition search window information to send one or more packets of information (316, 318) to destination 304. In one specific embodiment, SR 308 and/or SG 312 utilize a global signal hopping pattern (i.e., a hopping pattern which may be received by any node on the network).

In a present embodiment, SR 308 utilizes a fused preamble 306, while all other messages of SR/SG protocol 300 utilize a single preamble (e.g., SG 312 utilizes preamble 310, a data portion 316 utilizes data preamble 314, and a second data packet 318, which is illustrated having a single preamble). For instance, fused preamble 306 is designed with a length suitable to be acquired by any source/destination pair whose range and clock error are within a desirable maximum range in a network utilizing SR/SG protocol 300.

Typically, the content of an SR message, such as SR 308, is: Node S may attempt to send N data blocks to node D; this message was sent at time T. (Node S may represent a source, such as source 302, and node D may represent a destination, such as destination 304.) Timing information in SR 308 may be optional, since SR messages start at known acquisition search windows, and the transmission time may be implied from the time the SR message is received by the destination.

An SG message is sent by the recipient of an SR message (e.g., a destination) in response to the SR message. For example, a destination comprises a receiver and/or transceiver for receiving the SR and comprises a transmitter and/or a transceiver for transmitting the SG. The SG message assigns the transmitter of the SR message (e.g., the transmitter of the source) a slot to use in sending to the receiver of the destination. Typically, the content of an SG message, such as SG 312, is: Node S is assigned data slot L to send its data message(s) to D; the SR was received at time R. Timing information is included in the SG message to allow the source of the SR to compensate for any propagation delays and/or clock errors.

Data messages may be sent to a destination after a source receives the SG. For example, data portion 316 (with data preamble 314) is sent by source 302 to destination 304 after source 302 receives SG 312. Additionally, any number of data packets may be scheduled from one SR/SG interchange (between source and destination). Further data packets may be transmitted after completion of a single data packet, or alternatively, further data packets may have staggered data portions, such that one data message preamble begins just as another data preamble ends. For instance, second data packet 318 begins without an additional SR/SG interchange after data portion 316 is completed. Alternative queuing of data messages will be discussed further with reference to FIGS. 5 and 6.

Figure 4:
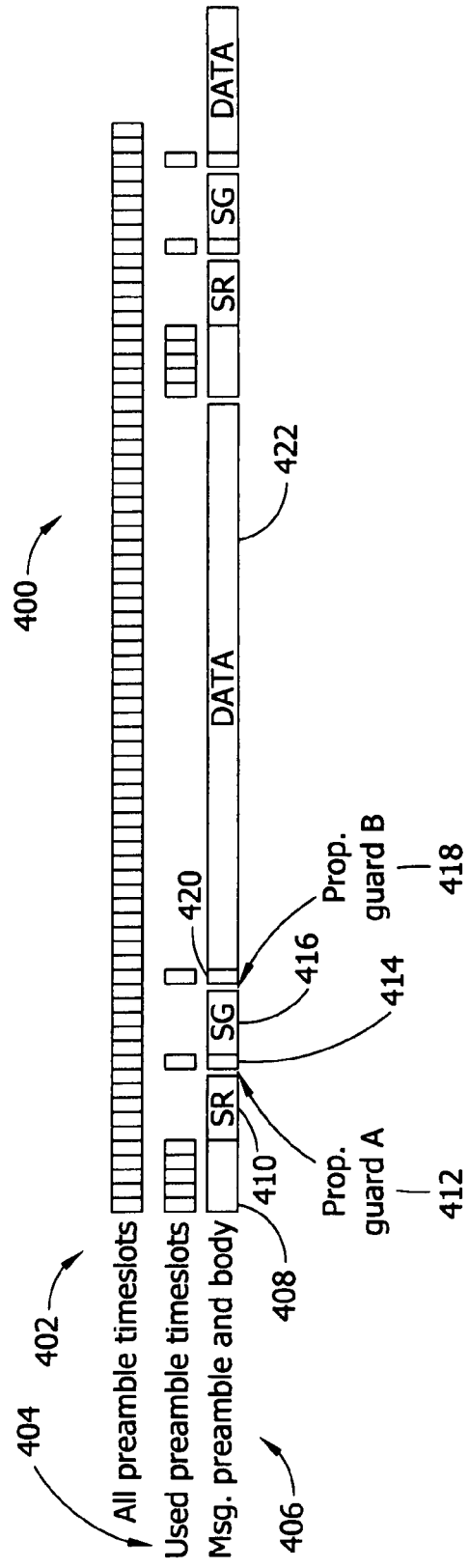
FIG. 4 is an SR/SG protocol displayed in accordance with another exemplary embodiment of the present invention.

Referring now to FIG. 4, an SR/SG protocol 400 is displayed in accordance with an additional embodiment of the present invention. SR/SG protocol 400 comprises all preamble timeslots 402, used preamble timeslots 404, and a message preamble and body 406. All preamble timeslots 402 indicate the repeating sequence of preamble timeslots, the divisions of a signal during which a preamble may originate for a signal transmission. In a specific embodiment, the width of a single timeslot within all preamble timeslots 402 is the width between acquisition search windows of FIG. 1 (e.g., the width between acquisition search window 106 and the previous or subsequent acquisition search window).

Message preamble and body 406 comprises fused preamble 408, SR 410, preamble 414, SG 416, data preamble 420, and data portion 422, each of which may include attributes similar or identical to fused preamble 306, SR 308, preamble 310, SG 312, data preamble 314, and data portion 316, respectively. Typically data portions of data packets, such as data portion 316 and data portion 422, are longer than either SRs or SGs, such as SR 308, SR 410, SG 312, and SG 416. Additionally, fused preamble 408 may be approximately the same length as SG 416.

A source originates SR 410 and a destination originates SG 416. In a present embodiment, a message from the source to the destination is initiated when the source generates or receives data to send to the destination, such as data encoded in data portion 422. The source then waits for the next scheduled SR start time and broadcasts the SR to all nodes on the network. For example, the source may wait for a start time based on the synchronized network timing schedule and then may broadcast SR 410 with preceding fused preamble 408. The SR start time may be part of a fixed, network-wide schedule to increase the efficiency and accuracy of the transmissions within the network. When a network-wide schedule is used, the destination which receives the SR may acquire an accurate estimate of the time delay between the destination and the source, as part of the demodulation process.

After receiving the SR, the destination decodes the data portion of the SR (e.g., SR 410). The data portion of the SR may contain information identifying the source of the transmission and that the source includes data to send to the destination. The destination may then generate an SG message, such as SG 416, indicating the slot assignment for the forthcoming data packet and the time delay measured during acquisition and demodulation. The slot assignment of SG 416 of SR/SG protocol 400 is 1, however it may be understood that more complex communications scenarios (such as those in FIGS. 5 and 6) may require additional or different slot assignments, depending on the number of data fragments and messages transmitted between sources and destinations. Since the time delay between the destination and the source is generally known by the destination, the destination transmits SG 416 such that preamble 414 arrives at the source when a search acquisition window is activated and searching for a preamble. To accomplish the arrival, the destination may advance or delay the time that SG 416 is transmitted.

The destination may transmit preamble 414 and SG 416 using receiver-dependent or transmitter-dependent signal parameters, rather than global signal parameters, to reduce overall network interference in the SG timeslot. For instance, receiver-dependent or transmitter-dependent signal parameters depend on the receiver or transmitter address and the acquisition search window, whereas a global signal parameters may depend only on the acquisition search window in which the global signal hopping pattern starts. Receiver-dependent or transmitter-dependent signal parameters may be utilized since the source and destination both distinguish the identity of the other. The signal parameters that may vary include (but are not limited to) the time and frequency used in a hopping signal and the known symbol patterns used for acquisition.

An SR/SG propagation guard time, such as a first propagation guard 412, may provide a buffer for the SG transmission, to account for signal propagation delay and clock error (time delays in the communication system). In a present embodiment, the length of propagation guard 412 is equal to twice the maximum propagation delay plus clock error. The maximum propagation delay would occur when the source and destination are at the range limit of the communication network. In this instance, the SR would arrive at the destination at the last possible time, and the destination would be required to send the SG early by the maximum possible advance to enable the SG to arrive at the source at the correct time, as dictated by the synchronized network timing schedule. Once the source receives preamble 414 and SG 416, the source reads the slot assignment and the delay from SG 416. The source then transmits a first data message during a specified slot start time, minus the delay. An SG/data propagation guard time, such as a second propagation guard 418, may provide a buffer for the data message transmission, to account for signal propagation delay. In a present embodiment, the length of propagation guard 418 is equal to the maximum propagation delay between a source and destination in the communication system to compensate for timing requirements at the destination.

If an additional data packet is scheduled for transmission from the source to the destination, then the data packet may be sent in a next recurrence of the assigned slot after completion of the previous or first data packet.

The source may transmit preamble 420 and data body 422 using receiver-dependent or transmitter-dependent signal parameters. The signal parameters may be varied in the same fashion as the parameters of preamble 414 and SG 416 or in a different fashion.

In one specific embodiment, SR/SG protocol 400 utilizes approximately 12.5% of available preamble timeslots. For instance, fused preamble 408 is a fused preamble comprising five preamble timeslots, whereas the data portions of the SR and the SG (SR 410 and SG 416) are each 4.5 preamble timeslots, preamble 414 is one preamble timeslot, data preamble 420 is one preamble timeslot, and data portion 422 is 38.5 preamble timeslots. Total preamble usage (used preamble slots 404) is approximately 7 preamble timeslots, whereas the total length of the SR/SG and data packet transmission (including first propagation guard 412 and second propagation guard 418) is approximately 56 preamble timeslots. Thus, the preamble timeslot usage becomes approximately 7/56, or approximately 12.5%.

Figure 5:
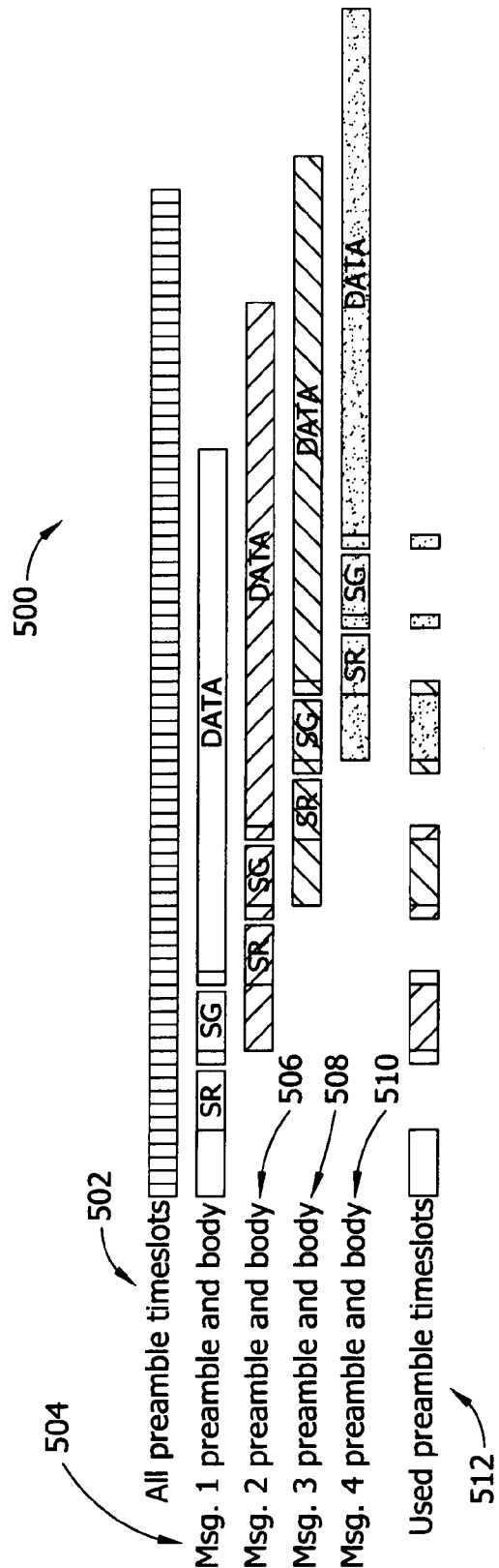
FIG. 5 is an SR/SG protocol displayed in accordance with a further exemplary embodiment of the present invention.

FIG. 5 depicts an SR/SG protocol 500 in accordance with a further exemplary embodiment of the present invention. SR/SG protocol 500 involves interleaving a plurality of message packets, such as a first message 504, a second message 506, a third message 508, and a fourth message, 510. Utilizing SR/SG protocol 500, data portions of one message may overlap with the preamble of another message, thereby enabling several message groups to be overlaid in time, such as depicted in FIG. 5. For example, preambles of one message may utilize preamble timeslots during which data portions of previous messages are transmitting. However, the length of data portions may determine how subsequent message packets are structured. According to the embodiment in FIG. 5, a fused preamble of an SR message begins after the passage of 11 preamble timeslots. Within the 11 preamble timeslots, seven preamble timeslots are occupied with SR or SG preambles. Thus, the used preamble timeslots 512 of all available preamble timeslots 502 becomes 7/11, or 64%.

Figure 6:
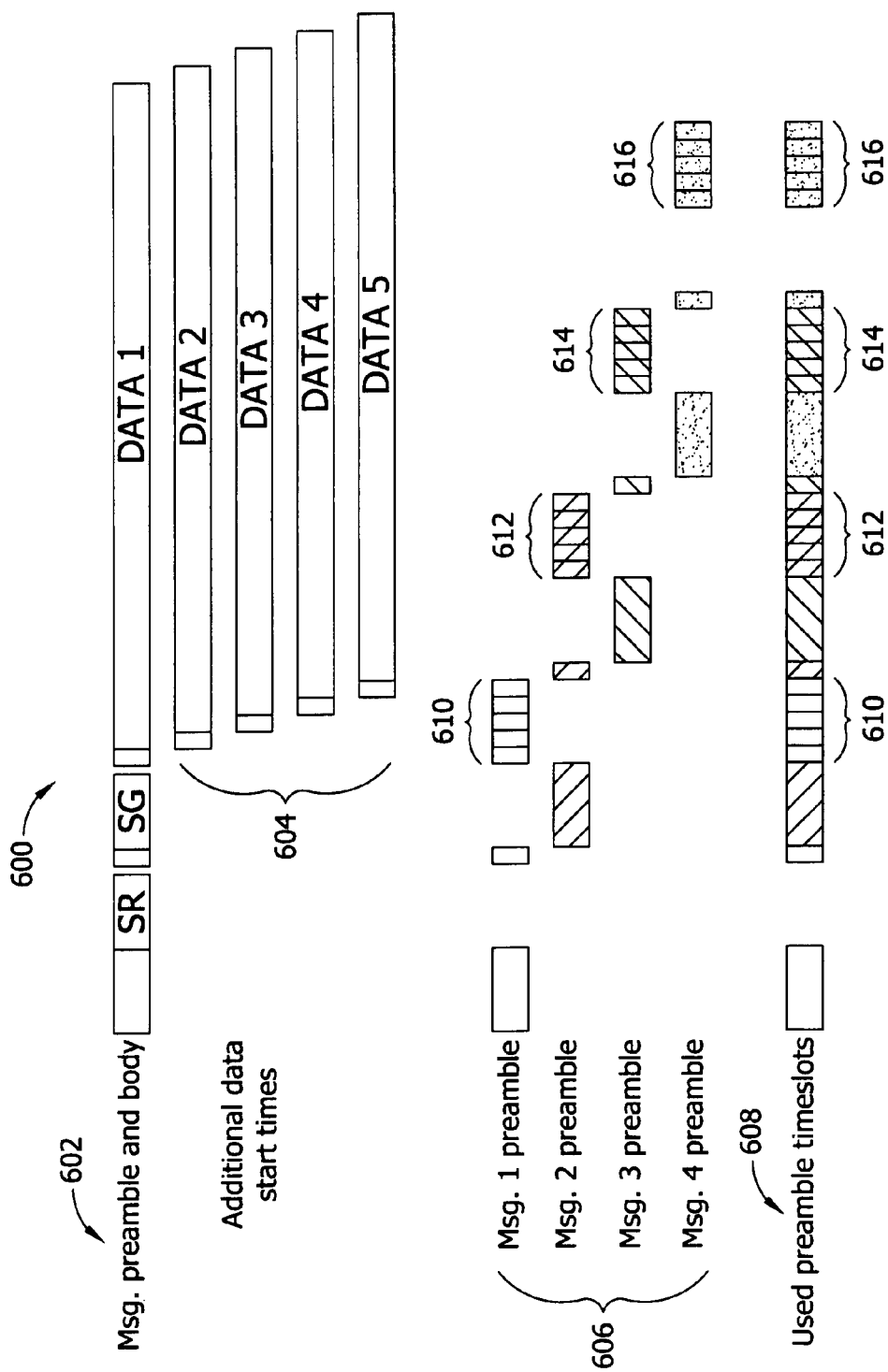
FIG. 6 is an SR/SG protocol displayed in accordance with yet another exemplary embodiment of the present invention.

FIG. 6 depicts SR/SG protocol 600 in accordance with a further exemplary embodiment of the present invention. SR/SG protocol 600 comprises a message preamble and body 602, a plurality of data streams 604, and a plurality of message preambles 606, and accounts for the used preamble timeslots 608. Unused preamble timeslots (or gaps within used preamble timeslots 512 of FIG. 5) may be filled with preambles of multiple data streams to be scheduled in independent data slots. For example, the plurality of data streams 604 comprises data streams with staggered preambles, with each preamble utilizing the subsequent timeslot of the preceding data stream preamble timeslot. In a present embodiment, each receiver of a destination has five possible data slots, so five data streams may be staggered (utilizing desirable simultaneous multi-receive functionality). The staggering of data streams may occur for multiple interleaved message streams, such as messages 504-510 of FIG. 5. Therefore, staggered preamble blocks utilize previously unused timeslots (such as gaps within used preamble timeslots 512 of FIG. 5). For instance, the plurality of message preambles 606 displays staggered preamble blocks 610, 612, 614, and 616 for a first message stream, a second message stream, a third message stream, and a fourth message stream, respectively.

It is contemplated that a plurality of used preamble slots 608 define the global, network-wide assignment of timeslots, where similarly hatched timeslots indicate the slots that may be used in the same SR/SG/data sequence (however, only one data slot may be used per transmitter). Thus, by staggering multiple data streams, more efficient use of timeslots may be achieved. Further, since the width of a timeslot may be the length between acquisition search windows, SR/SG protocol 600 enables efficient use of acquisition search windows for providing an effective low SNR communication system.

In some instances, an SR or an SG may be dropped. For example, all SR messages sent in the same timeslot use the same hopping pattern/correlation sequence, thus, two messages that are too closely spaced in time may be indistinguishable and one or both messages may be lost. It may be desirable to keep SR and SG messages relatively short to allow a source to quickly detect that a destination has not transmitted an SG. The source may then resend the SR, though a larger back-off may be desirable to reduce network congestion.

The SG and data packets are sent on transmitter-specific or receiver-specific hopping/acquisition patterns, so they do not have the same destructive hop-by-hop collision that affect some SR messages. In addition, each receiver has only one transmitter configured to send the receiver a message in a particular SG or data slot, thereby simplifying the detection problem (removing the need to attempt to detect multiple transmissions spaced closely in time and/or Doppler). However, SG and data packets may be dropped due to random noise variance or other factors. A dropped SG packet produces the same response as a dropped SR: the source will resend the SR after an SR has timed out, restarting the process. A dropped data packet may be detected by a link-layer acknowledgement (discussed below), or may be handled by a higher-level protocol (e.g. TCP's reliability guarantee).

Further embodiments may be implemented to enhance or compliment the embodiments of the SR/SG protocols described above. For example, in a specific embodiment, a link-layer acknowledgement (ACK) is implemented within an SR/SG protocol to confirm the correct transfer of data packets. An ACK timeslot may be added to an SR/SG/data sequence, where the ACK timeslot may be a dedicated slot which occurs subsequent to the end of the most recent-starting data packet. Such a placement may provide the shortest possible latency in sending the ACK. Alternatively, the SR message may be extended to assign the destination a regular data slot for use in sending an ACK to the source.

In another specific embodiment, the SG portion of the SR/SG protocol is omitted to support a probabilistic broadcast scheduling algorithm, which enables the SR/SG protocol to provide for broadcast messages. For instance, the SR/SG protocol may not natively support broadcast messages, since SG messages may be too small to contain user data. Additionally, a broadcast transceiver may not receive and/or support an SG from every node on the network. In this embodiment, the source transmits an SR assigning a slot to the receivers of destinations, rather than requesting a slot. If a receiver has not already assigned this slot to another transmitter, the broadcast would reserve the slot. At an assigned time, such as a time dictated by the network-wide timing schedule, the source would send the data message to all destinations that received the SR and did not previously schedule the assigned data slot to a different source. This embodiment may be beneficial for use in networks that are relatively lightly loaded, so that the assigned slot is likely to be previously unassigned for most receivers.

In a further embodiment, the SR/SG protocol may support broadcast messages by omitting the SG portion and using the SR message as a long data header, rather than as a message. For example, the SR message comprises data indicating, "A broadcast message follows." This SR message is followed immediately by a data body (without a preamble), and contains the data portion of the broadcast. The receiver may use timing information from the SR preamble to decode the data block in the data body. This embodiment may be beneficial for use in networks with fast demodulation and decode hardware.

In yet another embodiment, the SR/SG protocol supports power control on SG and data messages. Low-power communications are generally desirable for both interference and power consumption reasons. By adding power control information to the SR and SG messages, the SR/SG protocol supports power control on the SG and data messages. The SR messages may contain a measure of the effective transmit power and local noise environment, allowing the destination to estimate the path loss when sending the SG. The SG may contain an SNR measurement from the SR acquisition and demodulation process, indicating to the source how much to increase/decrease power when sending the data message(s).

In a still further embodiment, the SR/SG protocol is configured for neighbor state awareness, where a node in the network monitors nearby nodes based on transmission/receiving information. Since SR messages are broadcast to all neighbors on the network, a node may monitor when all neighbors are transmitting, and may estimate how many streams are received by monitoring the SR messages which are sent by/addressed to each neighbor. This monitored information may be used to delay transmission to nodes that are currently transmitting (or receiving many simultaneous streams) until they stop transmitting (or receiving).

Figure 7:
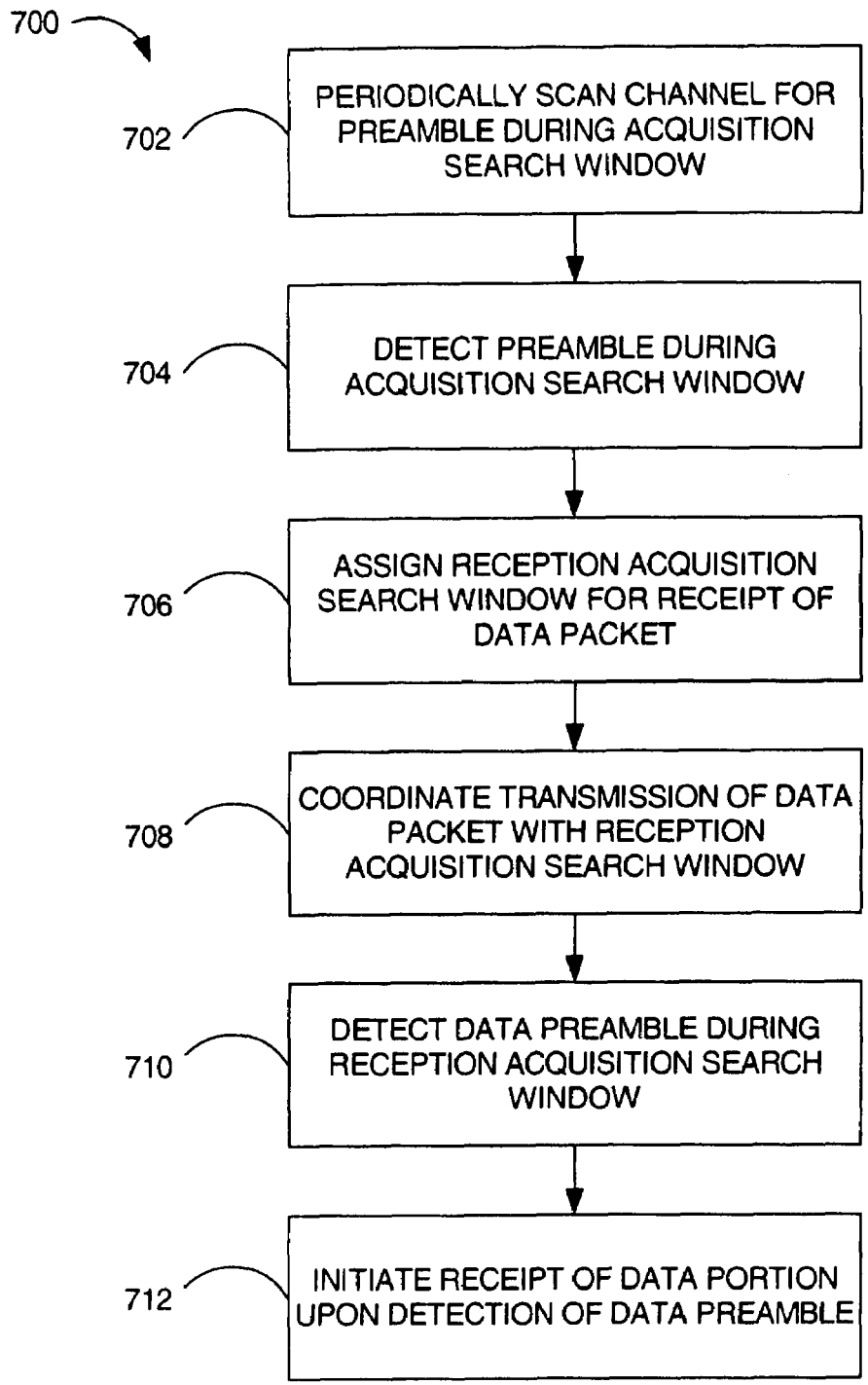
FIG. 7 displays a flowchart of a method for receiving data packets in a communication network in accordance with an exemplary embodiment of the present invention.

Referring now to FIG. 7, a flowchart of a method 700 for receiving data packets in a communication network in accordance with an exemplary embodiment of the present invention is shown. Method 700 periodically scans a channel for a preamble during an acquisition search window 702. The preamble may be an individual preamble, or may comprise multiple connected preambles, such as a fused preamble. The communication system utilizing method 700 may employ simultaneous multi-receive functionality. Method 700 also detects the preamble during the acquisition search window 704. Method 700 further assigns a reception acquisition search window for receipt of a data packet including a data preamble and a data portion 706. Method 700 still further coordinates the transmission of the data packet with the reception acquisition search window 708. For example, a precise timing synchronization may be utilized to ensure receipt of the transmission during a relatively short acquisition search window. Additionally, method 700 detects the data preamble during the reception acquisition search window 710. Method 700 also initiates receipt of the data portion upon detection of the data preamble. Upon receipt, data demodulation hardware may demodulate the data portion of the data packet.

Figure 8:
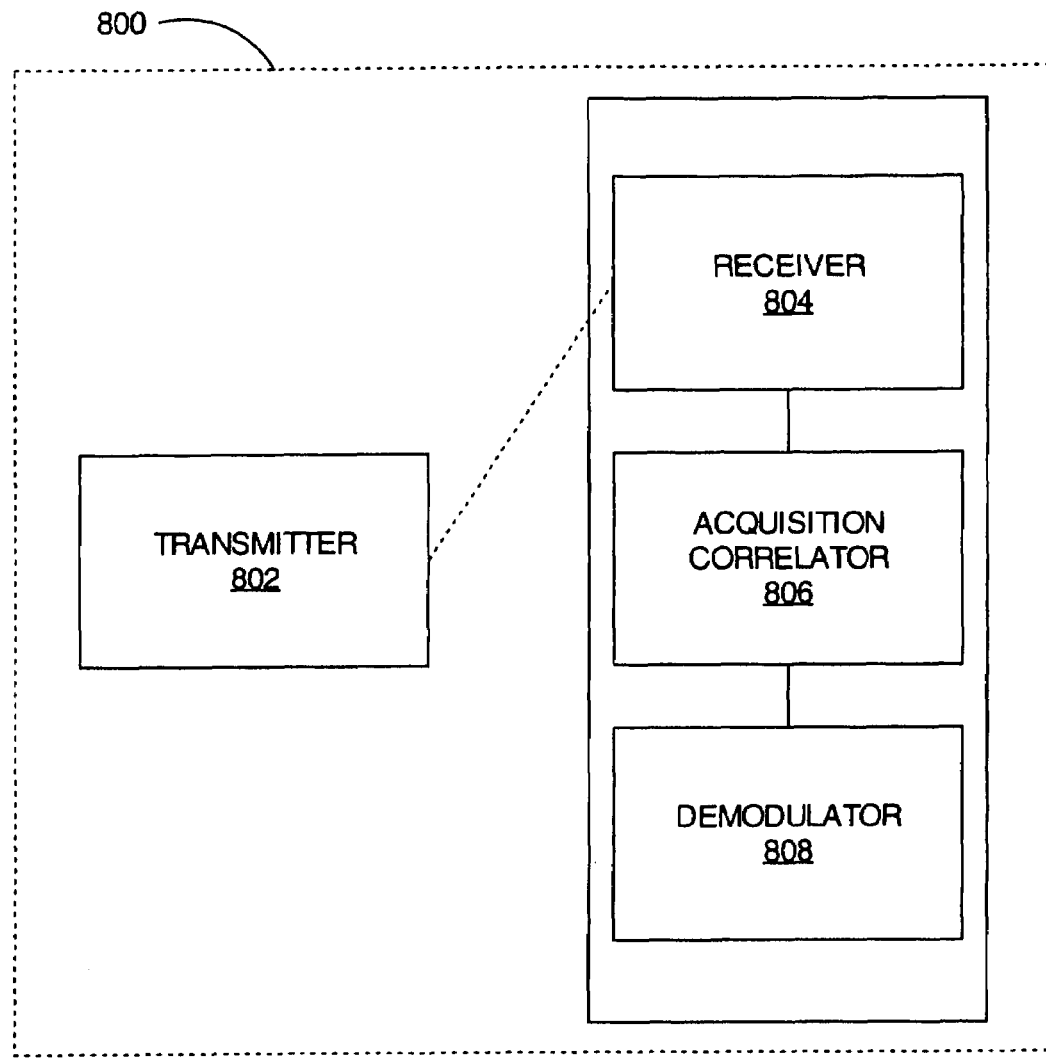
FIG. 8 displays a block diagram of a communication system in accordance with an exemplary embodiment of the present invention.

Referring now to FIG. 8, a block diagram of a communication system 800 is displayed in accordance with an exemplary embodiment of the present invention. Communication system 800 comprises a transmitter 802, a receiver 804, an acquisition correlator 806, and a demodulator 808. Transmitter 802 is communicatively coupled with receiver 804, such that signals with preambles transmitted from transmitter 802 may be desirably received by receiver 804. For example, transmitter 802 communicates with receiver 804 via a wireless connection. Acquisition correlator 806 may be communicatively coupled with receiver 804, such that relatively short acquisition search windows scan the signal received by receiver 804 for preambles beginning within the acquisition search window. Demodulator 808 may be communicatively coupled with acquisition correlator 806, such that acquisition correlator 806 may trigger demodulator 808 to demodulate a data portion of the signal received by receiver 804 and detected by an acquisition search window. Several identical or non-identical demodulators may be communicatively coupled with acquisition correlator 806 as one method of enabling simultaneous multi-receive.

It is to be noted that the foregoing described embodiments according to the present invention may be conveniently implemented using conventional general purpose digital computers, digital signal processors, reconfigurable hardware, application specific hardware, or any combination of these, programmed, configured or designed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program, product which employs a computer-readable storage medium including stored computer code which is used to program a computer or digital signal processor, or configure hardware to perform the disclosed function and process of the present invention. The computer-readable medium may include, but is not limited to, any type of conventional floppy disk, optical disk, CD-ROM, magnetic disk, hard disk drive, magnetooptical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for receiving data packets in a communication network, comprising:
   scanning a channel, by a receiver, for a preamble during an acquisition search window;
   detecting the preamble during the acquisition search window;
   assigning a reception acquisition search window for receipt of a data packet including a data preamble and a data portion;
   coordinating the transmission of the data packet with the reception acquisition search window;
   detecting the data preamble during the reception acquisition search window;
   initiating receipt of the data portion upon detection of the data preamble;
   wherein the acquisition search window is periodically repeated following a length comprising the sum of the acquisition search window and the preamble.

2. The method of claim 1, wherein the preamble is a fused preamble to compensate for at least one of propagation delay and clock error.

3. The method of claim 1, wherein a slot grant assigns the reception acquisition search window for receipt of the data packet.

4. The method of claim 3, wherein the preamble and the slot grant are approximately the same length.

5. The method of claim 1, wherein the length further comprises a processing time.

6. The method of claim 1, wherein coordinating the transmission of the data packet comprises a propagation guard time.

7. The method of claim 1, wherein at least one of the preamble or data are transmitted via a frequency-hopping pattern.

8. A computer-readable medium having computer-executable instructions for performing a method for receiving data packets in a communication network, the method comprising:
   periodically scanning a channel, by a receiver, for a preamble during an acquisition search window;
   detecting the preamble during the acquisition search window;
   assigning a reception acquisition search window for receipt of a data packet including a data preamble and a data portion;
   coordinating the transmission of the data packet with the reception acquisition search window;
   detecting the data preamble during the reception acquisition search window;
   initiating receipt of the data portion upon detection of the data preamble; and
   wherein the acquisition search window is periodically repeated following a length comprising the sum of the acquisition search window and the preamble.

9. The computer-readable medium of claim 8, wherein the preamble is a fused preamble to compensate for at least one of propagation delay and clock error.

10. The computer-readable medium of claim 8, wherein coordinating the transmission of the data packet comprises a propagation guard time.

11. The computer-readable medium of claim 8, wherein the preamble is transmitted via a frequency-hopping pattern.

* * * * *